UNITED STATES PATENT OFFICE.

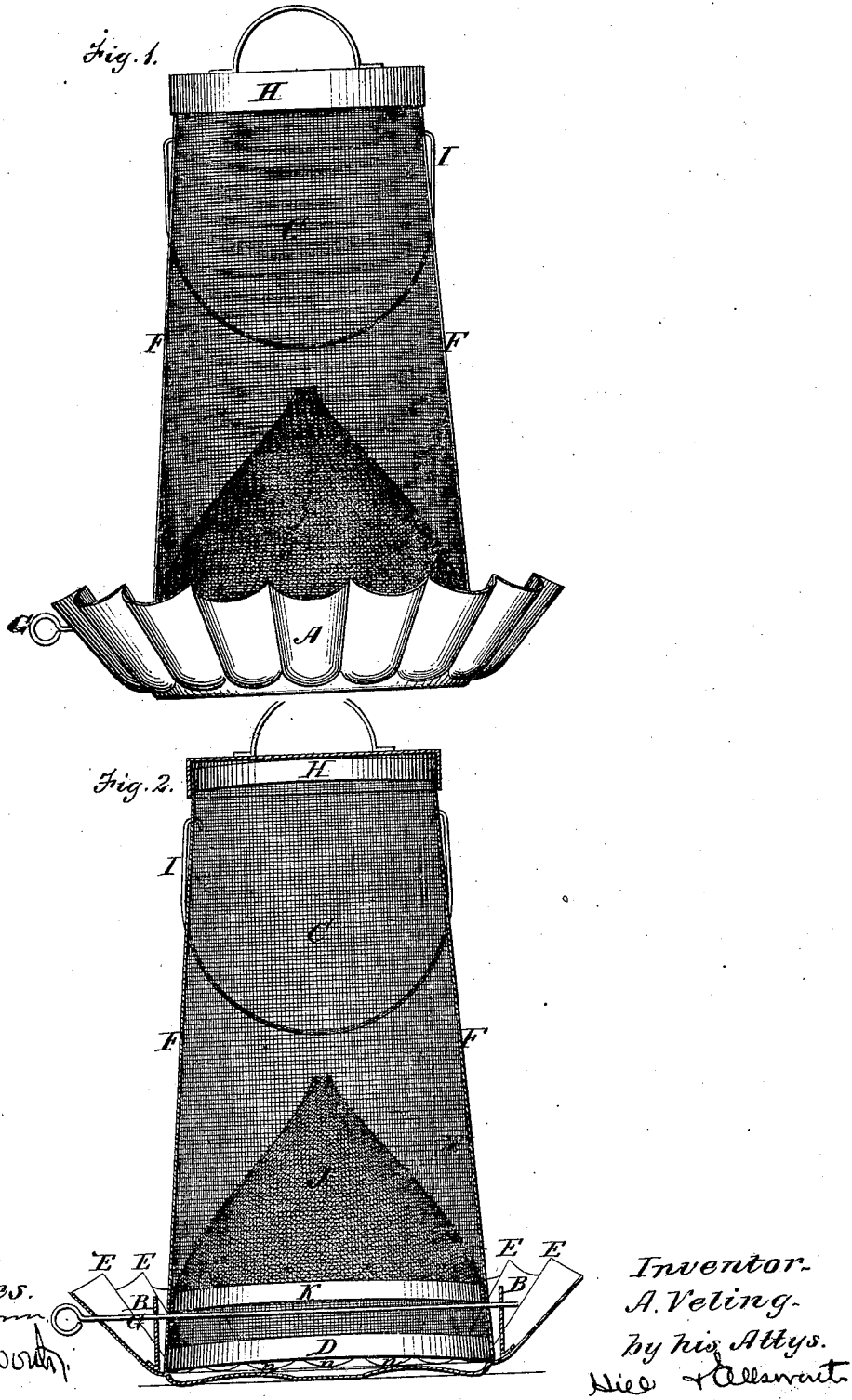

ANDREW VELING, OF PANA, ILLINOIS, ASSIGNOR TO JOSEPH VELING, OF SAME PLACE.

IMPROVEMENT IN FLY-TRAPS.

Specification forming part of Letters Patent No. 133,507, dated November 26, 1872.

*To all whom it may concern:*

Be it known that I, ANDREW VELING, of Pana, in the county of Christian and State of Illinois, have invented a new and Improved Fly-Trap; and I do hereby declare the following to be a full, clear, and exact description of the same, reference being had to the accompanying drawing forming part of this specification, in which—

Figure 1 is a side elevation, and Fig. 2 is a transverse vertical section.

Similar letters of reference in the accompanying drawing indicate the same parts.

The object of this invention is to produce a simple, cheap, and effective fly-trap; and to this end the invention consists in an improved construction and combination of parts, substantially as I will now proceed to describe.

In the drawing, A is an ordinary scalloped pan, to the inside of which, near the edge of the bottom part, are secured, at diametrically-opposite points, two vertical lugs, B, between which is placed a bottomless wire vessel, C, having around its bottom a metal ring, D, which rests on the ridges E of the pan so that each scallop presents a way of ingress into the vessel C beneath the ring D. Metal strips F extend from the top to the bottom of the vessel C at diametrically-opposite points, and these are placed in line with the lugs B. A rod, G, passed through both the lugs and the strips, holds the vessel in the pan. The vessel has a removable cover, H, and a bail, I. Inside the vessel, above the rod G, is placed a closely-fitting bottomless wire cone, J, having a metal ring, K, secured around its lower edge and an opening in its top.

Bait being placed in the pan A, flies, in order to reach it, pass from the outside through the scallops n, and, having fed, they naturally fly upward, strike the cone J, and escape through the hole in its top into the vessel C, whence there is no escape.

Having thus described my invention, what I claim is—

The combination of the scalloped pan A having the lugs B, the vessel C having a cover, the cone J having an opening in its top, and the rod G, all constructed and arranged substantially as described.

ANDREW VELING.

Witnesses:
N. K. ELLSWORTH,
MELVILLE CHURCH.